US011135533B2

(12) United States Patent
Hubbard

(10) Patent No.: US 11,135,533 B2
(45) Date of Patent: Oct. 5, 2021

(54) OIL FILTER

(71) Applicant: Hubb Filters, Inc., Corte Madera, CA (US)

(72) Inventor: Christopher M. Hubbard, Jefferson, OR (US)

(73) Assignee: HUBB FILTERS, INC., Corte Madera, CA (US)

( * ) Notice: Subject to any disclaimer, the term of this patent is extended or adjusted under 35 U.S.C. 154(b) by 90 days.

(21) Appl. No.: 16/798,286

(22) Filed: Feb. 21, 2020

(65) Prior Publication Data

US 2020/0261829 A1  Aug. 20, 2020

Related U.S. Application Data

(60) Continuation of application No. 15/915,965, filed on Mar. 8, 2018, now Pat. No. 10,617,980, which is a
(Continued)

(51) Int. Cl.
*B01D 29/90* (2006.01)
*B01D 29/11* (2006.01)
(Continued)

(52) U.S. Cl.
CPC ............ *B01D 29/90* (2013.01); *B01D 29/114* (2013.01); *B01D 29/117* (2013.01); *B01D 29/54* (2013.01);
(Continued)

(58) Field of Classification Search
None
See application file for complete search history.

(56) References Cited

U.S. PATENT DOCUMENTS 3,268,077 A    8/1966   Ball
3,344,923 A   10/1967   Pall et al.
(Continued)

FOREIGN PATENT DOCUMENTS

EP    0773054 A1    5/1997
JP   09-144522 A    6/1997
(Continued)

OTHER PUBLICATIONS

U.S. Appl. No. 15/963,756 Office Action dated May 15, 2020.
(Continued)

*Primary Examiner* — Richard C Gurtowski
(74) *Attorney, Agent, or Firm* — Wilson Sonsini Goodrich & Rosati

(57) ABSTRACT

An oil filter assembly is disclosed for a machine, such as an internal combustion engine, that has an oil output port and an oil input port. A mounting plate may be fixed with an outer enclosure and may be adapted for securing to the machine. The mounting plate may be further adapted to conduct oil from the machine into a peripheral portion of the outer enclosure, and then returning oil from a central portion of the outer enclosure back to the machine. Oil may pass from the peripheral portion to the central portion through a primary filter having a first porosity. A pressure-actuated valve may be fixed fluidly between the peripheral portion and central portion of the outer enclosure. Oil may pass through the pressure-actuated valve only when an oil pressure differential between the peripheral portion and the central portion of the outer enclosure exceeds a predetermined threshold pressure. A secondary filter may have a second porosity greater than the first porosity, and may be fixed fluidly between the pressure-actuated valve and the central portion of the outer enclosure.

20 Claims, 12 Drawing Sheets

Related U.S. Application Data division of application No. 13/825,519, filed as application No. PCT/US2011/052637 on Sep. 21, 2011, now Pat. No. 9,943,787.

(60) Provisional application No. 61/385,099, filed on Sep. 21, 2010.

(51) Int. Cl.

| | | |
|---|---|---|
| *B01D 29/54* | (2006.01) | |
| *B01D 29/96* | (2006.01) | |
| *B01D 35/147* | (2006.01) | |
| *B01D 41/04* | (2006.01) | |
| *F01M 11/03* | (2006.01) | |
| *B01D 29/58* | (2006.01) | |
| *F01M 1/10* | (2006.01) | |

(52) U.S. Cl.
CPC .............. *B01D 29/58* (2013.01); *B01D 29/96* (2013.01); *B01D 35/147* (2013.01); *B01D 41/04* (2013.01); *F01M 11/03* (2013.01); B01D 2201/24 (2013.01); F01M 2001/1092 (2013.01)

(56) References Cited

U.S. PATENT DOCUMENTS

| | | |
|---|---|---|
| 3,726,403 A | 4/1973 | Shaltis |
| 4,038,189 A | 7/1977 | Dison et al. |
| 4,089,783 A | 5/1978 | Holyoak |
| 4,222,875 A | 9/1980 | Sikula, Jr. et al. |
| 4,622,136 A | 11/1986 | Karcey |
| 4,732,678 A | 3/1988 | Humbert, Jr. |
| 4,735,720 A | 4/1988 | Kersting |
| 4,783,271 A | 11/1988 | Silverwater |
| 5,066,391 A | 11/1991 | Faria |
| 5,071,551 A | 12/1991 | Muramatsu et al. |
| 5,300,223 A | 4/1994 | Wright |
| 5,350,515 A | 9/1994 | Stark et al. |
| 5,411,659 A | 5/1995 | Nichols |
| 5,440,957 A | 8/1995 | Rogers |
| 5,510,029 A | 4/1996 | Benian |
| 5,569,373 A | 10/1996 | Smith et al. |
| 5,643,448 A | 7/1997 | Martin et al. |
| 5,711,872 A | 1/1998 | Jones et al. |
| 5,740,772 A | 4/1998 | Bluma |
| 5,779,900 A | 7/1998 | Holm et al. |
| 5,785,850 A | 7/1998 | Lynch et al. |
| 5,814,211 A | 9/1998 | Leo |
| 5,830,371 A | 11/1998 | Smith et al. |
| 5,895,568 A | 4/1999 | Koltunov |
| 6,006,924 A | 12/1999 | Sandford |
| 6,024,229 A | 2/2000 | Ayers |
| 6,068,762 A | 5/2000 | Stone et al. |
| 6,085,915 A | 7/2000 | Schwandt et al. |
| 6,267,875 B1 | 7/2001 | Leo |
| 6,488,848 B1 | 12/2002 | Smith |
| 6,540,914 B1 | 4/2003 | Smith |
| 6,709,575 B1 | 3/2004 | Verdegan et al. |
| 7,090,773 B2 | 8/2006 | Meddock et al. |
| D530,779 S | 10/2006 | Lee |
| 7,323,106 B2 | 1/2008 | Jaroszczyk et al. |
| 7,413,089 B1 | 8/2008 | Tidwell |
| D600,776 S | 9/2009 | Hubbard |
| 7,597,202 B1 | 10/2009 | Tidwell |
| 8,187,458 B2 | 5/2012 | Hubbard et al. |
| 8,709,240 B2 | 4/2014 | Hubbard |
| 9,339,746 B2 | 5/2016 | Hubbard |
| 9,943,787 B2 | 4/2018 | Hubbard |
| 9,987,575 B2 | 6/2018 | Hubbard |
| 10,617,980 B2 * | 4/2020 | Hubbard .............. B01D 29/117 |
| 2003/0041731 A1 | 3/2003 | Paydar et al. |
| 2003/0192432 A1 | 10/2003 | Gubler |
| 2004/0035769 A1 | 2/2004 | Mouhebaty |
| 2004/0255783 A1 | 12/2004 | Graham et al. |
| 2005/0103701 A1 | 5/2005 | Bechtum et al. |
| 2005/0126965 A1 | 6/2005 | Meddock et al. |
| 2006/0021925 A1 | 2/2006 | Stifelman |
| 2006/0102533 A1 | 5/2006 | Faria |
| 2006/0102534 A1 | 5/2006 | Faria |
| 2007/0251887 A1 | 11/2007 | Koos et al. |
| 2010/0095843 A1 | 4/2010 | Gebert et al. |
| 2010/0237022 A1 | 9/2010 | Hubbard et al. |
| 2011/0041796 A1 | 2/2011 | Sachdev et al. |
| 2011/0296806 A1 | 12/2011 | Krisko et al. |
| 2012/0292265 A1 | 11/2012 | Hubbard |
| 2014/0069874 A1 | 3/2014 | Hubbard |
| 2014/0190527 A1 | 7/2014 | Hubbard |
| 2016/0228803 A1 | 8/2016 | Hubbard |
| 2018/0236382 A1 | 8/2018 | Hubbard |
| 2018/0304180 A1 | 10/2018 | Hubbard |

FOREIGN PATENT DOCUMENTS

| | | |
|---|---|---|
| JP | 2000501992 A | 2/2000 |
| JP | 2005520970 A | 7/2005 |
| JP | 2005330928 A | 12/2005 |
| KR | 20-027516 Y1 | 5/2002 |
| WO | WO-9701385 A1 | 1/1997 |
| WO | WO-2006121319 A1 | 11/2006 |
| WO | WO-2008026892 A1 | 3/2008 |
| WO | WO-2010107657 A2 | 9/2010 |
| WO | WO-2012040382 A2 | 3/2012 |

OTHER PUBLICATIONS

International Search Report and Written Opinion dated Mar. 22, 2012 for International PCT Patent Application No. PCT/US2011/052637.
International Search Report and Written Opinion dated Oct. 26, 2010 for International PCT Patent Application No. PCT/US2010/027007.
Notice of Allowance dated Jan. 21, 2016 for U.S. Appl. No. 14/204,724.
Notice of Allowance dated Feb. 3, 2012 for U.S. Appl. No. 12/406,878.
Notice of Allowance dated Jul. 29, 2009 for U.S. Appl. No. 29/331,439.
Notice of Allowance dated Dec. 11, 2013 for U.S. Appl. No. 13/481,709.
Notice of Allowance dated Dec. 11, 2017 for U.S. Appl. No. 13/825,519.
Office Action dated Mar. 27, 2013 for U.S. Appl. No. 13/481,709.
Office Action dated May 11, 2017 for U.S. Appl. No. 13/825,519.
Office Action dated Oct. 12, 2017 for U.S. Appl. No. 15/133,028.
Office Action dated Oct. 27, 2011 for U.S. Appl. No. 12/406,878.
Office Action dated Dec. 3, 2012 for U.S. Appl. No. 13/481,709.
Office Action dated Dec. 14, 2016 for U.S. Appl. No. 13/825,519.
U.S. Appl. No. 15/915,965 Notice of Allowance dated Feb. 4, 2020.
U.S. Appl. No. 15/133,028 Notice of Allowance dated Feb. 23, 2018.
U.S. Appl. No. 15/963,756 Office Action dated Jan. 16, 2020.
U.S. Appl. No. 15/915,965 Office Action dated Jul. 8, 2019.

* cited by examiner

SECTION A-A

OIL FILTER

CROSS-REFERENCE

This application is a continuation of U.S. application Ser. No. 15/915,965, filed Mar. 8, 2018, which is a divisional application of U.S. application Ser. No. 13/825,519, filed Jun. 24, 2013, which is a U.S. national phase application under 35 U.S.C. § 371 of International App. No. PCT/US2011/052637, filed Sep. 21, 2011, which claims the benefit of U.S. Provisional Application No. 61/385,099, filed Sep. 21, 2010, each of which applications is entirely incorporated herein by reference.

FIELD OF THE INVENTION

This invention relates to filters, and more particularly to an improved engine oil filter assembly that may also translate into a fuel filter, transmission filter, $H_2O$ filter, hydraulic fluid filter, medical, dental, gas, or deep fry oil filter.

BACKGROUND OF THE INVENTION

Conventional oil filters for vehicle engines, such as automotive internal combustion engines, typically include a filter media and a bypass valve that is actuated when the filter media becomes dirty and substantially plugged. For example, U.S. Pat. No. 5,066,391 to Faria on Nov. 19, 1991, which is hereby incorporated by reference, teaches such a device. One drawback with such devices is that once the bypass valve is opened, particulate debris that would normally be captured by the filter media is able to traverse the valve and re-enter the engine, leading to engine wear and eventual damage. However, forcing oil through a filter media has the drawback that once the filter media becomes plugged with particulate matter, not enough oil can get through the filter to effectively cool and lubricate the engine, leading to much sooner engine damage than if even dirty oil were allowed to circulate. Another drawback of such devices is that particulate matter, once captured on a leading side of the filter media, can be dislodged from the filter to return back to the engine once the bypass valve opens, since flow of the oil at that point changes from through the filter media to across the filter media.

Other such filters are disclosed in U.S. Pat. No. 5,711,872 to Jones et al. on Jan. 27, 1998; U.S. Pat. No. 6,068,762 to Stone et al. on May 20, 2000; U.S. Pat. No. 6,540,914 to Smith on Apr. 1, 2003; and U.S. Pat. No. 7,413,089 to Tidwell on Aug. 19, 2008, which are hereby incorporated by reference in their entirety. These devices suffer many of the same drawbacks as the Faria device.

Therefore, there is a need for a device that overcomes the drawbacks associated with the prior art.

SUMMARY OF THE INVENTION

The invention provides an oil filter assembly for a machine, such as an internal combustion engine, or any other device that has an oil output port and an oil input port. A mounting plate may be fixed with an outer enclosure, such as with a first set of cooperative threads, and may be adapted for securing to the machine, such as with a second set of cooperative threads. The mounting plate may be further adapted to conduct oil from the oil output port of the machine into a peripheral portion of the outer enclosure, and then returning oil from a central portion of the outer enclosure into the oil input port of the machine.

A primary filter has a first porosity. Oil may pass through the primary filter to move from a first portion (e.g., peripheral portion) to a second portion (e.g., central portion) of the outer enclosure. A pressure-actuated valve is fixed fluidly between the peripheral portion and central portion of the outer enclosure. Oil may pass through the pressure-actuated valve only when an oil pressure differential between the peripheral portion and the central portion of the outer enclosure exceeds a predetermined threshold pressure, such as when the primary filter 50 becomes dirty. A secondary filter may have a second porosity greater than the first porosity, and may be fixed fluidly between the pressure-actuated valve and the central portion of the outer enclosure.

As such, as oil traverses the oil filter assembly from the oil output port of the machine to the oil input port of the machine, the oil passes through either the primary filter or, if the predetermined pressure threshold $P_t$ has been reached, either the primary filter or the secondary filter. When the primary filter becomes dirty, such as after a predetermined number of machine operating hours, for example, the oil filter assembly may be disassembled and each component washed, preferably in a standard dishwasher or the like by means of simple hot water and dish soap. By alternative means a parts washer may also be used.

The invention includes a filter device that opens the bypass pressure-actuated valve once the primary filter becomes plugged or the fluids viscosity becomes less significant by means of temperatures or choice and additionally the pressure difference (PSID) would increase by other forces, but additionally continues to filter the oil through the secondary more porous filter. The present device is easily installed, serviced and cleaned. Place fingers in cooling groves carefully and unscrew the cooling cover and set down then unscrew the media from the mounting plate and inspect for debris on the main filter. Next remove the secondary filter located on the bottom of the main filter using the supplied Lifetime Oil Filter® Wrench, or any other wrench or similar tool. Carefully unscrew and remove. Using the same LOF wrench or other tool, unscrew the secondary filter until it comes apart make sure to not lose the sphere, springs, seals or secondary media. Drain any engine oil left in the filters media back into cooling cover.

The filters media can be cleaned at home using hot tap water and plain old dish washing soap in conjunction with a non scratching sponge or brush. In commercial applications a parts washing system will also achieve excellent results. Dry the filter media with a synthetic cloth or a household hair dryer. Other apparatuses such as in a conventional household dishwasher will perform also. Reassemble the clean parts the opposite way they were taken apart. Once the secondary media is reinstalled properly carefully screw the main media section of the filter onto the mounting plate until firm then ¼ turn more make sure the filtered bypass unit is screwed into the main filter bottom. Carefully lift the cooling cover, place fingers into grooves. Slowly screw on the filter to the mounting plate. This process is to restore the effectiveness of the primary filter, and is made of durable materials that can last potentially longer than the vehicle or machine to which it is installed. The present invention further cools the oil as it passes therethrough. Other features and advantages of the present invention will become apparent from the following more detailed description, taken in conjunction with the accompanying drawings, which illustrate, by way of example, the principles of the invention.

Preferably, the filter device could open a bypass valve once the primary filter becomes plugged, but would additionally filter the oil through a secondary more porous filter. Furthermore, the filter may be easily cleaned to restore the effectiveness of the primary filter, and would be made of durable materials that would last potentially longer than the machine to which it is fixed. Such a device could further provide for cooling of the oil as it passes therethrough.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. The words "oil" or "oils," when used the description and the claims, shall refer to any fluid, such as liquid, gel, or gas, to be filtered, and are not necessarily limited to engine or machine lubricating fluids.

The invention provides oil filter assemblies and associated systems and methods, such as an internal combustion engine, or any other device that has an oil output port and an oil input port. Various aspects of the invention described herein may be applied to any of the particular applications set forth below or for any other types of filters. The invention may be applied as a standalone system or method, or as part of an integrated machine package, such as an engine. It shall be understood that different aspects of the invention can be appreciated individually, collectively, or in combination with each other.

Figure 1A:
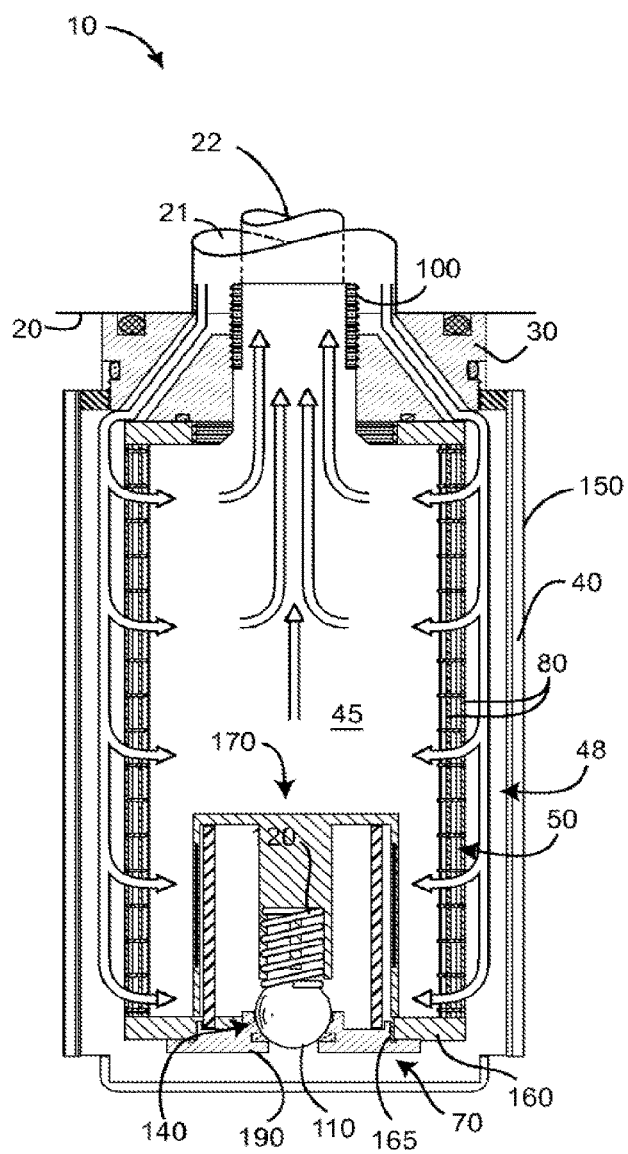
FIG. 1A is a cross-sectional view of the invention, illustrating a flow of oil through a primary filter within an outer enclosure of the invention.
Figure 1B:
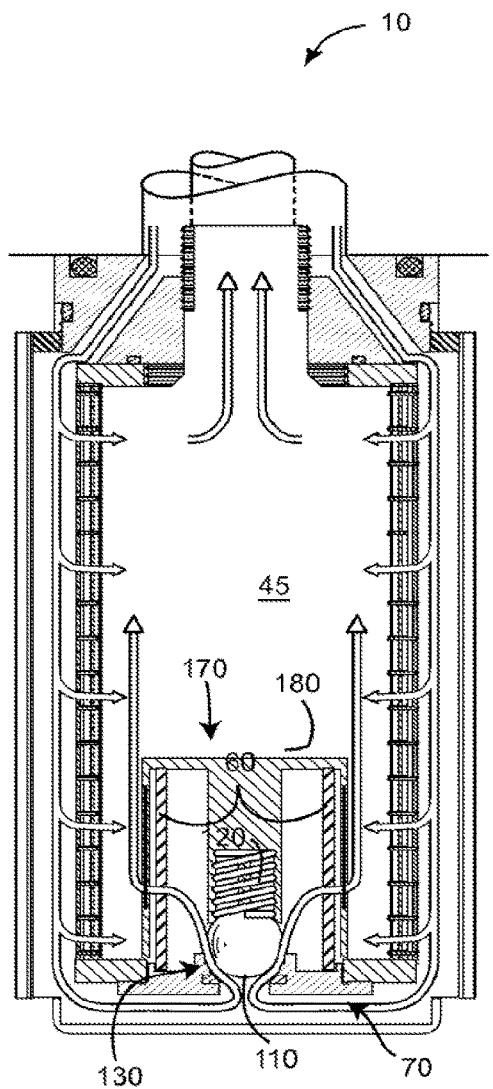
FIG. 1B is a cross-sectional view of the invention of FIG. 1A, wherein a pressure differential between peripheral and central portions of the enclosure exceeds a threshold pressure to open a pressure-actuated valve of the invention, illustrating a flow of oil through both the primary filter and a secondary filter.
Figure 2:
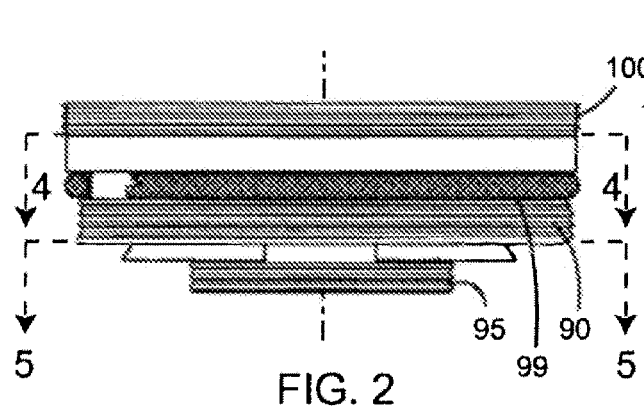
FIG. 2 is a side elevational view of a mounting plate of the invention.
Figure 3:
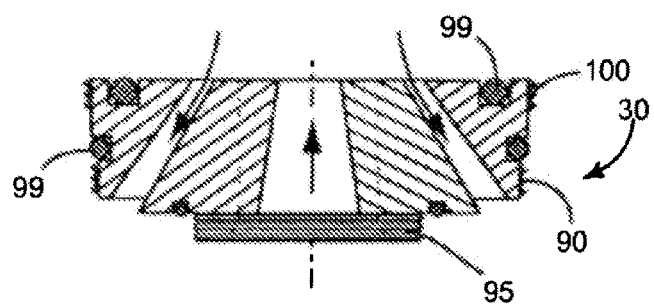
FIG. 3 is a cross-sectional view of the mounting plate, taken generally along lines 3-3 of FIG. 4.
Figure 4:
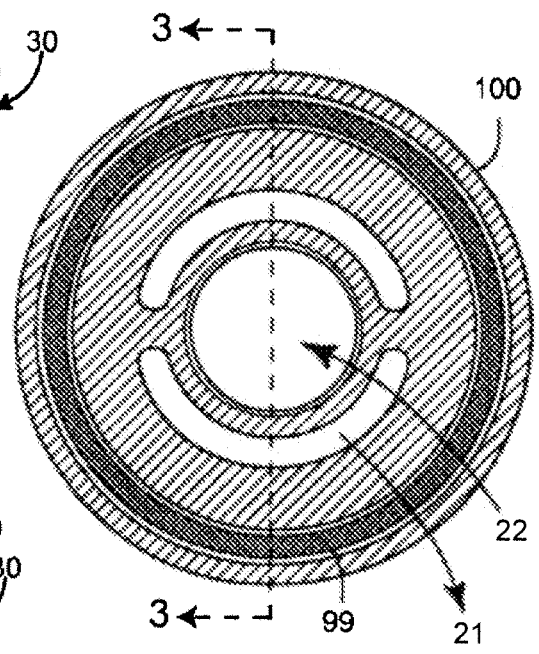
FIG. 4 is a bottom plan view thereof.
Figure 5:
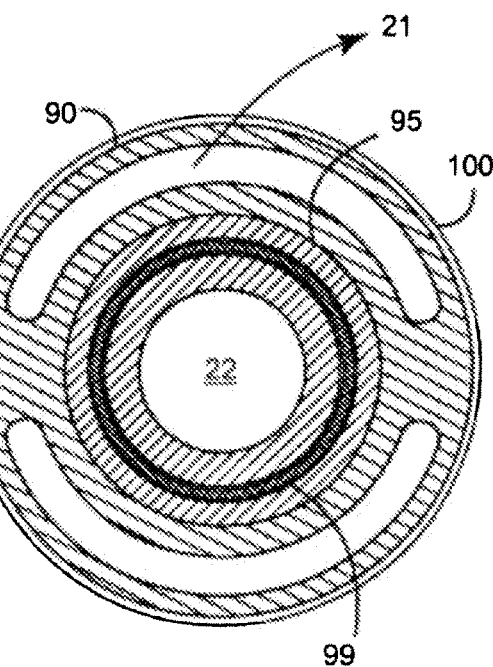
FIG. 5 is a top plan view thereof.

FIGS. 1A and 1B illustrate an oil filter assembly 10 for a machine 20, such as an internal combustion engine, that has an oil output port 21 and an oil input port 22. A mounting plate 30 (e.g., FIGS. 2-5) may be fixed with an outer enclosure 40, such as with a first set of cooperative threads 90, and is adapted for securing to the machine 20, such as with a second set of cooperative threads 100. In alternate embodiments, a mounting plate may be removably fastened to a machine or filter assembly using any fastening mechanism, which may include those listed further below. In some embodiments, the mounting plate 30 is further adapted to conduct oil from the oil output port 21 of the machine 20 into a peripheral portion 48 of the outer enclosure 40 (FIG. 1A), and then return oil from a central portion 45 (FIGS. 1A and 1B) of the outer enclosure 40 into the oil input port 22 of the machine 20.

In some embodiments, an oil output port may surround an oil input port. In alternate embodiments, the oil input port may surround the oil output port or be adjacent to the oil output port. In some embodiments, the oil output port may be in fluid communication with a peripheral portion of a filter assembly outer enclosure and the oil input port may be in fluid communication with a central portion of the filter assembly outer enclosure. Alternatively, the oil output port may be in fluid communication with a central portion of a filter assembly outer enclosure and the oil input port may be in fluid communication with a peripheral portion of the filter assembly outer enclosure. For example, oil may enter through a central portion and pass through a filter and be returned to a machine via the peripheral portion.

Oil may be received in a first region of the filter assembly from the oil output port, and may be provided from a second region of the filter assembly to the oil input port. The first and second region may be in fluid communication via one or more filter. For example, the first and second regions may be in fluid communication through one or more primary filter. In some embodiments, one or more secondary filter may be provided. The first and second region may be in fluid communication through the one or more secondary filter at limited times. For example, one or more valve may be provided that may have a closed position wherein the first and second region are not in fluid communication via the secondary filter, and an open position wherein the first and second region are in fluid communication via the secondary filter. The second region may be concentrically positioned within the first region, the first region may be concentrically positioned within the second region, or first and second regions may be adjacent to one another.

In some embodiments, the outer enclosure and a primary filter may have a cylindrical configuration. The primary filter may be configured in a concentric manner within the outer enclosure. In alternate embodiments, the outer enclosure and primary filter may have any other shape, such as a prism or tube with a circular, elliptical, triangular, quadrilateral, pentagonal, hexagonal, octagonal, or any other shape cross section. The primary filter may be provided at a concentric location within the outer enclosure. Alternatively, it may be within any portion of the outer enclosure and may separate a first and second region of the oil filter assembly in any manner.

Figure 6:
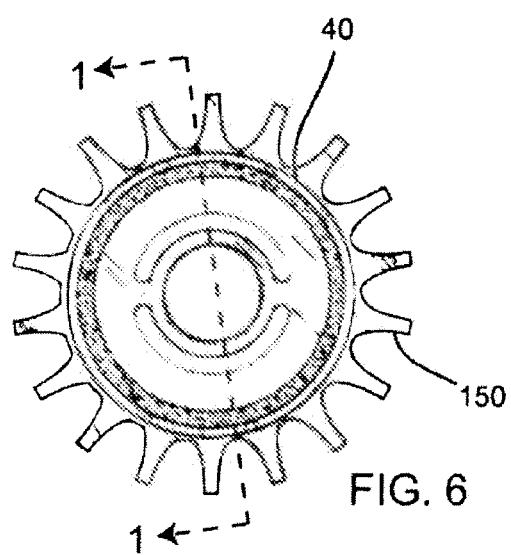
FIG. 6 is a bottom plan view of the invention.

In one embodiment, the enclosure 40 includes a plurality of cooling fins 150 (FIG. 6) protruding radially therefrom. Any other shaped surface feature may be provided that may assist with cooling the enclosure. The shaped surface feature may increase the surface area of the outer enclosure. The shaped surface feature may include fins, which may be aligned radially, in a spiraling pattern, as circles, in a random manner, or any other distribution, or any other protrusion, bumps, ridges, grooves, channels, or holes. The cooling fins and/or other shaped surface features may be integrally formed on the enclosure surface. Alternatively, they may be provided as separate pieces. The cooling fins and/or any other shaped surface features may or may not be removable from the enclosure surface. In some embodiments, cooling may occur passively. In alternate embodiments, a fluid flow may be actively provided over the shaped surface features. The shaped surface features may assist with cooling the enclosure and/or the oil contained within.

Further, the mounting plate 30 may include several Viton or similar seals 99 (FIGS. 3-5), as is known in the art. Such seals may enable the mounting plate to form a fluid tight seal between the filter assembly and the machine.

A primary filter 50 may have a first porosity $P_1$, preferably less than 125 microns. In one embodiment, the first porosity $P_1$ is about 5 microns. Alternatively, the first porosity may be less than, greater than, or be about 200 microns, 150 microns, 125 microns, 100 microns, 80 microns, 60 microns, 50 microns, 40 microns, 30 microns, 20 microns, 10 microns, 5 microns, or 1 micron. Oil may pass through the primary filter 50 to move from the peripheral portion 48 to the central portion 45 of the outer enclosure 40. Oil may pass through the primary filter to move from a first region to a second region, where one or more region is peripheral and one or more region is central, or the regions are adjacent to one another.

Figure 8:
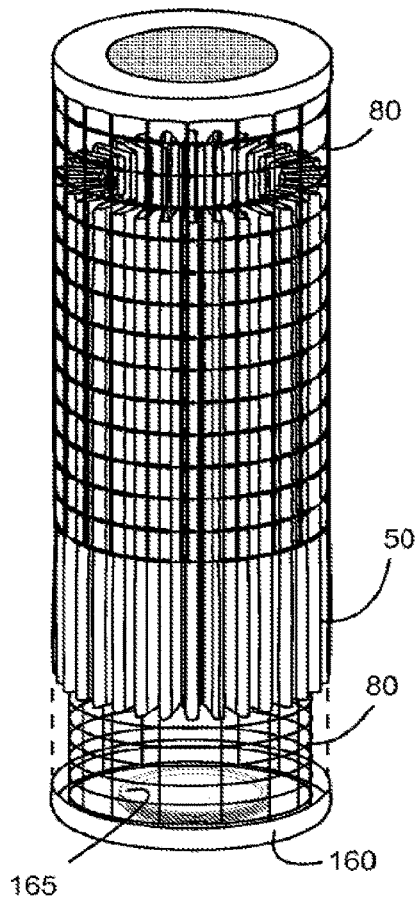
FIG. 8 is a partially exploded view of the primary filter of the invention.

In one embodiment, the primary filter 50 is sandwiched between two semi-rigid protective grids 80 (FIG. 8) each made from a durable, dishwasher safe material such as, or the like a semi-rigid titanium mesh, a metallic stainless mesh, a hybrid ceramic material, Nitronic 60, glass, stainless steel or aluminum alloy, micro glass, synthetic or carbon fibers on the order of 100 nanometers both with polymerization and electrospinning Protective grids 80 help maintain the shape of the primary and secondary filter while in use within the enclosure 40. In alternate embodiments, the protective layers need not be grids, but may have any other shape that may lend structural support to the filter while allowing oil to pass through. The protective layers may have one or more holes, openings, channels, or pathways that may allow oil to pass through. One, two, three, four or more protective layers may be provided.

Figure 9:
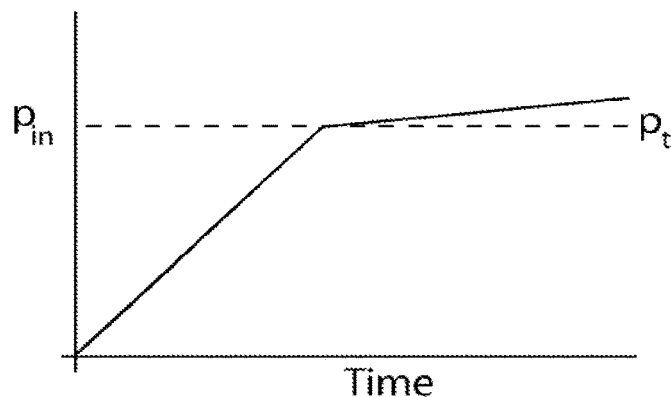
FIG. 9 is a pressure diagram showing a pressure within the enclosure over time, as the primary and secondary filters become dirty and clogged.

A pressure-actuated valve 70 is fixed fluidly between the peripheral portion 48 and central portion 45 of the outer enclosure 40. Oil may pass through the pressure-actuated valve 70 only when an oil pressure differential between the peripheral portion 48 and the central portion 45 of the outer enclosure 40 exceeds a predetermined threshold pressure $P_t$, such as when the primary filter 50 becomes dirty or clogged with debris or the viscosity is changed (FIG. 9). In some embodiments, $P_t$ may be about 14 psid. In other embodiments, $P_t$ may fall within about 10 psid to 20 psid, e.g., 10 psid, 11 psid, 12 psid, 13 psid, 13.5 psid, 13.8 psid, 14 psid, 14.2 psid, 14.5 psid, 15 psid, 16 psid, 17 psid, 18 psid, 19 psid, or 20 psid.

FIG. 9 shows that pressure may vary over time. For example, pressure may gradually increase as the primary filter becomes more clogged. At some point a threshold pressure $P_t$ may be met and may increase. In some embodiments, the pressure may increase at a lower rate over the threshold pressure as oil may flow through a secondary filter. The secondary filter may have a greater porosity than the primary filter, which may cause the lower rate of pressure increase. The pressure may be a pressure differential between a first and second region of the oil filter assembly. The pressure may be a pressure difference across a filter.

Alternatively, the pressure may be a pressure value within a region, such as the first or second region, of the oil filter assembly.

In one embodiment the pressure-actuated valve 70 is a ball valve that includes a ball 110 biased in a closed position 130 with a spring 120. The ball 110 may be urged into an open position 140 when the threshold pressure $P_t$ is exceeded. When the ball is urged into an open position, fluid may be allowed to flow through a secondary filter. When the ball is in a closed position, fluid is not allowed to flow through the secondary filter. Preferably the ball 110 and other components are durable and easily cleaned, such as titanium, tungsten, titanium Nitronic 60, ceramics, glass, stainless steel or aluminum alloy, rubber, copper, platinum, magnesium, gold, or iron, in billet, bar, round, cast, extruded or machined formed. Preferably, the ball and other components may be dishwasher safe.

Any additional type of bypass valve may be provided in alternate embodiments of the invention. The bypass valve may be any pressure-actuated valve. In some embodiments the bypass valve may have one or more component that may react to a pressure difference between a first and second region of the filter assembly. For example, when the pressure within a first region (e.g., a peripheral region) of the filter assembly, or when the pressure difference between the first and second regions of the filter assembly reach a threshold pressure, the component may be actuated to a open position, which may allow fluid flow through the bypass valve. The valve may be able to return to a closed position after being actuated to an open position. In some embodiments, the valve may return to a closed position when the pressure value or pressure differential falls below the threshold value. Alternatively, the valve may remain in an open position once opened. The component may be actuated directly by the pressure. Alternatively the pressure may determined by a sensor and the component may be actuated in response to the pressure reading.

Any other valve configuration known in the art may be used. In some embodiments, the valve may have a binary open and closed position. Alternatively, the valve may have a range of positions that may control the amount of flow. The valves may be adjusted based on pressure. Examples of valves that may be incorporated into the oil filter assembly may include, but are not limited to, ball valves, butterfly valves, choke valves, check valves, diaphragm valves, ceramic disc valves, gate valves, knife valves, needle valves, piston valves, pinch valves, plug valves, spool valves, thermal expansion valves, or poppet valve.

Figure 7:
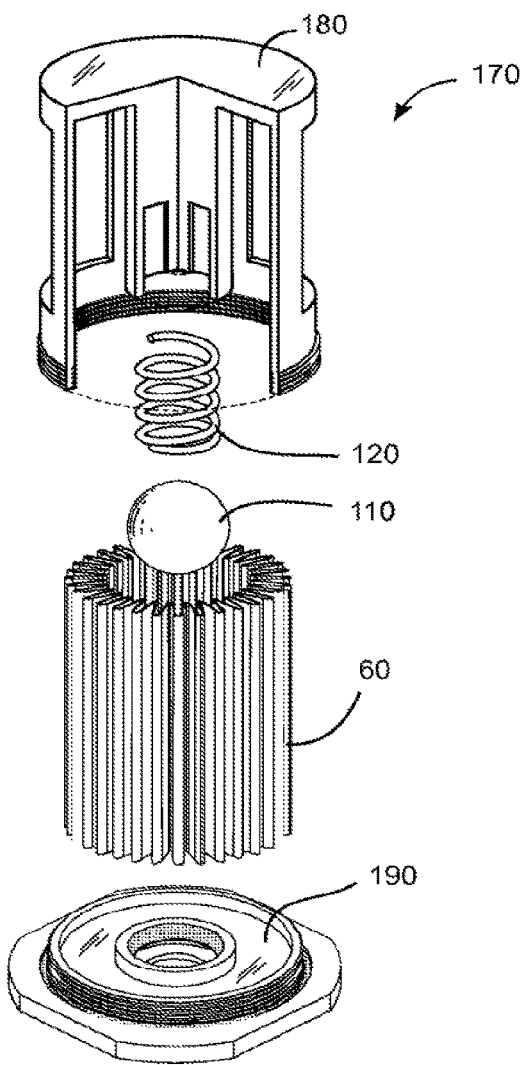
FIG. 7 is an exploded perspective view of a secondary filter assembly of the invention.

A secondary filter 60 has a second porosity $P_2$, $P_2$ preferably being greater than $P_1$, and is fixed fluidly between the pressure-actuated valve 70 and the central portion 45 of the outer enclosure 40 (FIGS. 1B and 7). Preferably $P_2$ is greater than about 125 microns. In one embodiment $P_2$ may be about 25 microns. In some instances, the second porosity may be greater than, less than, or be about 10 microns, 15 microns, 20 microns, 25 microns, 30 microns, 50 microns, 75 microns, 100 microns, 125 microns, 150 microns, 200 microns, 250 microns, or 300 microns. $P_2$ may be greater than $P_1$ by any amount. For example, $P_2$ may be greater than $P_1$ by more than, less than, or about 1%, 5%, 10%, 20%, 30%, 50%, 75%, 100%, 200% or any other value. In alternate embodiments, $P_2$ may be less than or equal to $P_1$.

In one embodiment, the primary filter 50 is substantially cylindrical and includes an end cap 160 (e.g., FIG. 8) that has a threaded aperture 165 for mounting thereto a secondary filter assembly 170 (e.g., FIG. 7). The secondary filter assembly 170 may include a secondary filter housing 180 that at least partially encloses the secondary filter 60 and fixes the secondary filter 60 and the pressure-actuated valve 70 to the end cap 160 with a ball seat and seal plate 190. The secondary filter housing and/or other components of the secondary filter assembly may be formed of a dishwasher safe material. The secondary filter housing may have one or more opening that may allow fluid to flow between a first and second region, such as a periphery and central region. In some embodiments, the secondary filter housing may be a protective grid.

As such, in some embodiments, as oil traverses the oil filter assembly 10 from the oil output port 21 of the machine 20 to the oil input port 22 of the machine 20, the oil must pass through either the primary filter 50 or, if the predetermined pressure threshold $P_t$ has been reached, the primary filter 50 and/or the secondary filter 60. With the cooling fins 150 of the enclosure 40, the oil is cooled as it passes through the peripheral portion 48 of the enclosure 40.

When the primary filter 50 becomes dirty, such as after a predetermined number of machine operating hours, for example, the oil filter assembly 10 may be disassembled and each component washed, preferably in a standard dishwasher or the like by means of simple hot water and dish soap. By alternative means a parts washer may also be used. As such, the primary and secondary filters 50, 60 are preferably made from a material that is dishwasher safe, corrosion resistant, and durable, such as a titanium mesh, a metallic stainless mesh, a hybrid ceramic material, Nitronic 60, glass, stainless steel, aluminum alloy, micro glass, copper, platinum, magnesium, gold, or iron, synthetic or carbon fibers on the order of 100 nanometers with polymerization and electrospinning.

In some embodiments, the oil filter assembly may be washed after a predetermined amount of time or number of cycles. In other embodiments, the oil filter assembly may be washed after a predetermined pressure within the first region or pressure difference between the first region and the second region. The predetermined pressure may indicate that the secondary filter is clogging up.

Preferably, the oil filter assembly and/or components of the oil filter assembly may be disassembled from the machine. For example, oil filter assembly may be detached from a mounting plate. Optionally, a mounting plate may be detached from the machine. Filters may or may not be removed from protective grids, and secondary filter assemblies may be removed from primary filter assemblies. Valve components may also be disassembled.

In one example, a user's fingers may be placed in cooling groves, and the user may carefully and unscrew the cooling cover and set it down. The user may then unscrew the media from the mounting plate and inspect for debris on the main filter. Next, the user may remove the secondary filter located on the bottom of the main filter using a supplied Lifetime Oil Filter® Wrench, or any other wrench or similar tool. The user may carefully unscrew and remove. Using the same supplied wrench or other tool, the user may unscrew the secondary filter until it comes apart make sure to not lose the sphere, springs, seals or secondary media. The user may drain any engine oil left in the filters media back into the cooling cover.

In some embodiments, all of the components may be washed by a washing apparatus, such as a dishwasher. In some embodiments, one or more component may be swapped or replaced. After washing, the components may be reassembled into an oil filter assembly and attached to the mounting plate and/or machine.

In one example, the filters media can be cleaned at home using hot tap water and dish washing soap in conjunction with a non scratching sponge or brush. In commercial applications a parts washing system may also achieve excellent results. After washing, the filter media may be dried. In some examples, the filter media may be dried with a synthetic cloth or a household hair dryer. Other apparatuses such as in a conventional household dishwasher may also perform.

The clean parts may be reassembled the opposite way/order they were taken apart. Once the secondary media is reinstalled properly, the main media section of the filter may be screwed or reattached in any other manner onto the mounting plate until firm. Then a quarter turn more may be applied to make sure the filtered bypass unit is screwed into the main filter bottom. The cooling cover may be lifted, and fingers may be placed into grooves. The filter may be slowly screwed or otherwise reattached to the mounting plate. This process may restore the effectiveness of the primary filter. The primary filter may be made of durable materials that can last potentially longer than the vehicle or machine to which it is installed.

Any of these components may be detached and/or reattached in any manner including, but not limited to, screwing, twisting, slide and locking, clamps, adhesives, snap-fits, or press-fits. Inner components may be removed from an outer enclosure.

Components of the air filter assembly may be washed any number of times. Components may be designed to withstand one or more, five or more, ten or more, twenty or more, fifty or more, a hundred or more, or a thousand or more wash cycles. Some components or may or may not have a longer life than other components.

A primary and secondary filter may be provided in accordance with an embodiment of the invention. In alternate embodiments, one or more primary filter and one or more secondary filter may be provided. In some embodiments, any number of filters may be layered on top of one another. Multiple filters may contact one another, gaps may be provided between filters, or protective grids may be provided between filters. Furthermore, additional levels of filters may be provided. For example one or more tertiary filter may be provided with a third porosity. In some embodiments, the third porosity may be greater than the first porosity and/or the second porosity. The tertiary filter may be accessed when the secondary filter is clogged or dirty. One or more valve may be provided that may allow fluid to flow through the tertiary filter when the pressure differential across the tertiary filter reaches a predetermined threshold.

While a particular form of the invention has been illustrated and described, it will be apparent that various modifications can be made without departing from the spirit and scope of the invention. For example, a ball valve is illustrated as the pressure-actuated valve 70 in the drawings, but a pin-valve or other equivalent pressure-actuated valve 70 may also be used including Globe, Gate and Butterfly. Accordingly, it is not intended that the invention be limited, except as by the appended claims.

The oil filter assembly may have any use or application, which may include an engine oil filter, a fuel filter, transmission filter, $H_2O$ filter, hydraulic fluid filter, medical, dental, gas, or deep fry oil filter. In some examples, the oil filter assembly may be used for internal combustion engines, or other engines for any type of vehicle, automobile, aircraft, or space exploration.

Figure 10A:
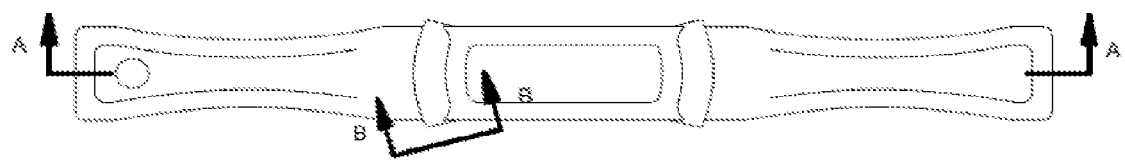
FIG. 10A shows a top view of a tool that can be used to assemble and/or disassemble an oil filter.

FIG. 10A shows a top view of a tool that can be used to assemble and/or disassemble an oil filter. The tool may be a wrench. In some embodiments, the tool may be a specialized wrench, such as a LOF wrench. The tool may be specially designed to interface with one or more components of an oil filter. The tool may or may not be integrally formed from a single piece. The tool may or may not have movable components. Any measurements are provided by way of example only and will not limit the design of the tool. In some embodiments, the tool may or may not be proportional to the measurements provided.

Figure 10B:
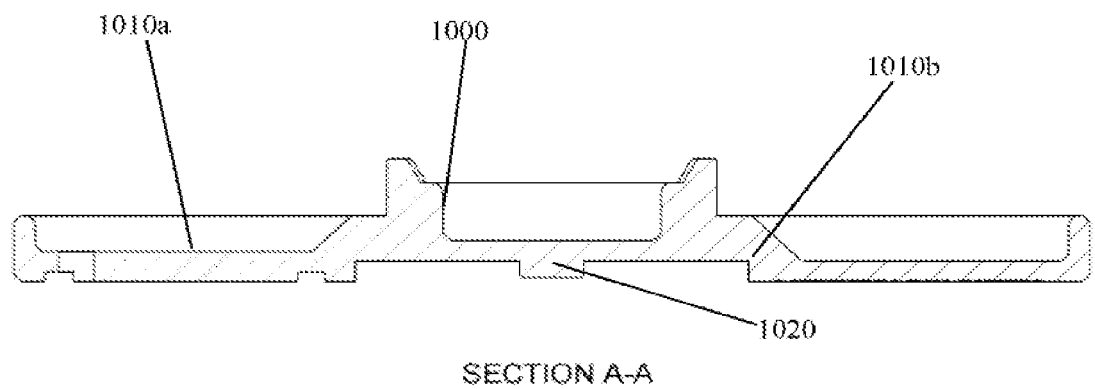
FIG. 10B shows a side view of a tool that can be used to assemble and/or disassemble an oil filter.

FIG. 10B shows a side view of a tool that can be used to assemble and/or disassemble an oil filter. The tool may have one or more section that may be useful for assembling and/or disassembling an oil filter. In some embodiments, a particular section may be used to assemble and/or disassemble a particular portion of the oil filter. The particular section of the tool may be fitted to the particular portion of the oil filter.

Figure 10C:
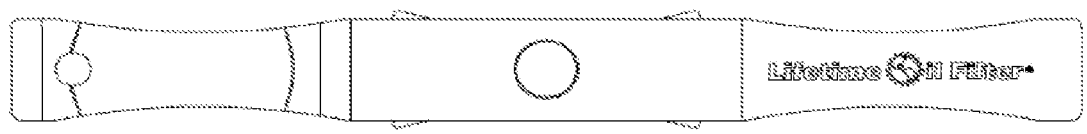
FIG. 10C shows a bottom view of a tool that can be used to assemble and/or disassemble an oil filter.

For example, a tool may have a central portion 1000. The tool may have one or more side portions 1010a, 1010b. In some embodiments, the tool may have one or more rear portions 1020. In some embodiments, the central portion, side portions and rear portions may interface with different sections of the oil filter. The various portions need not be adjustable. In some embodiments, the tool portions may be sized or shaped to grip or fit a particular portion of an oil filter. In some embodiments, portions of a wrench (such as a central portion, side portion or rear portion) may be used to screw and/or unscrew portions of the oil filter. In some embodiments, the same tool may be used to assemble and/or disassemble the oil filter. Alternatively, multiple tools may be used to assemble and/or disassemble the oil filter. FIG. 10C shows a bottom view of a tool that can be used to assemble and/or disassemble an oil filter.

Figure 10D:
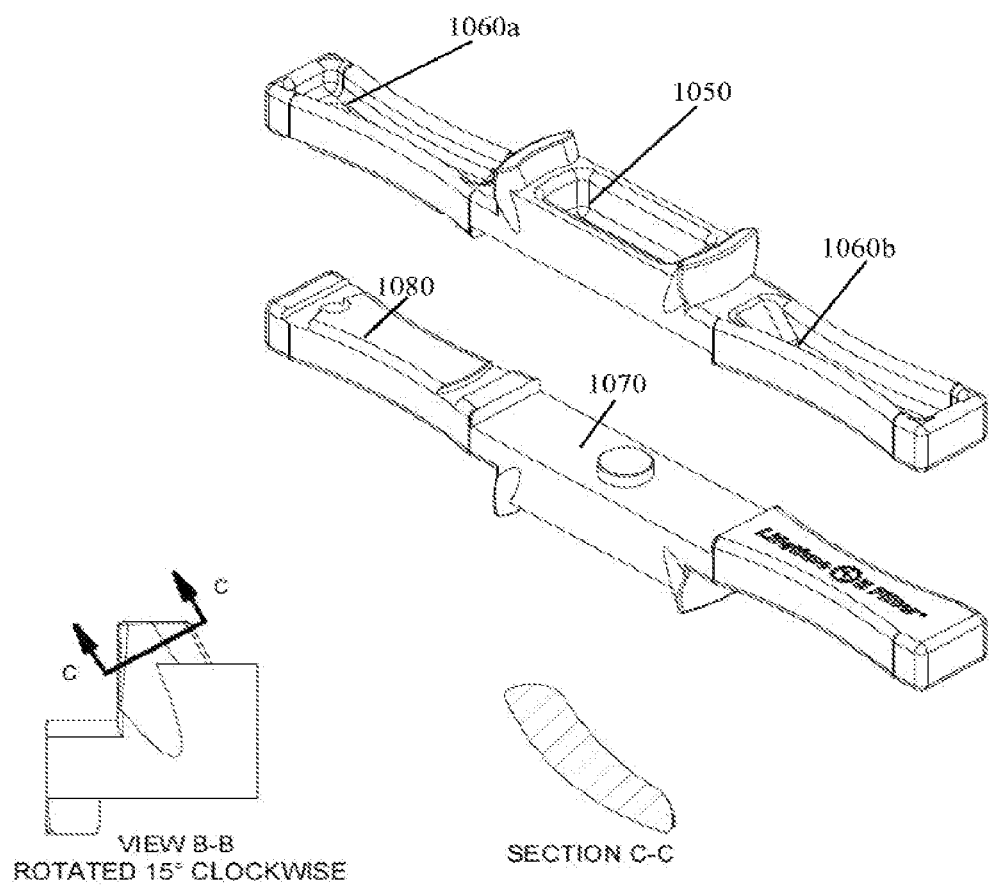
FIG. 10D shows additional views of a tool that can be used to assemble and/or disassemble an oil filter.

FIG. 10D shows additional views of a tool that can be used to assemble and/or disassemble an oil filter. The tool may have one or more central portion 1050, side portion 1060a, 1060b or rear portion 1070. In some embodiments, a side-rear portion 1080 may be provided. A side portion may be contoured so that a user can comfortably grip the tool. In some embodiments, a user may grip one, two or more side portions to apply torque to a portion of the tool.

FIGS. 11-23 provide an example of how an oil filter may be disassembled, cleaned, and reassembled. One or more of the steps may be provided in other orders or may be optional. Additional or alternate steps may be provided. Although some steps are illustrated using a tool, a tool may not be required (e.g., hand tightening or loosening may be used), or a different tool from the one illustrated may be used. Any embodiments of an oil filter described herein may be assembled and/or disassembled as illustrated.

Figure 11:
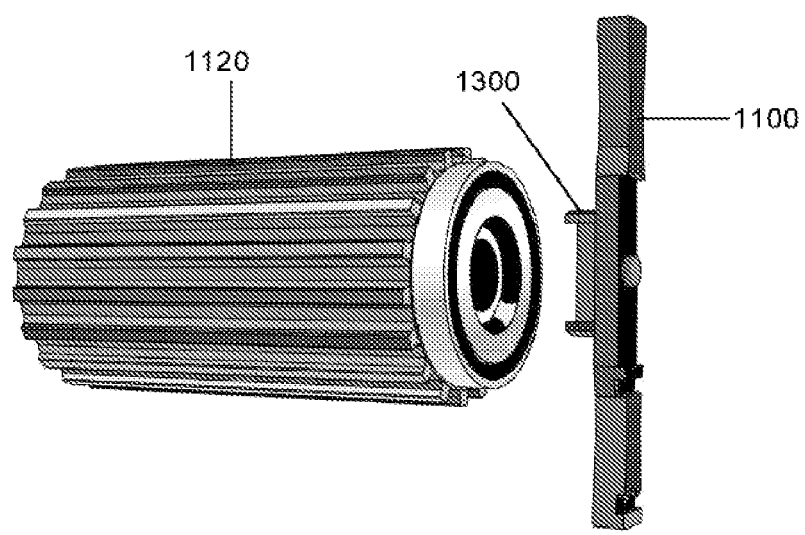
FIG. 11 shows how a tool can be used to unscrew a primary filter assembly from a cover.
Figure 11:
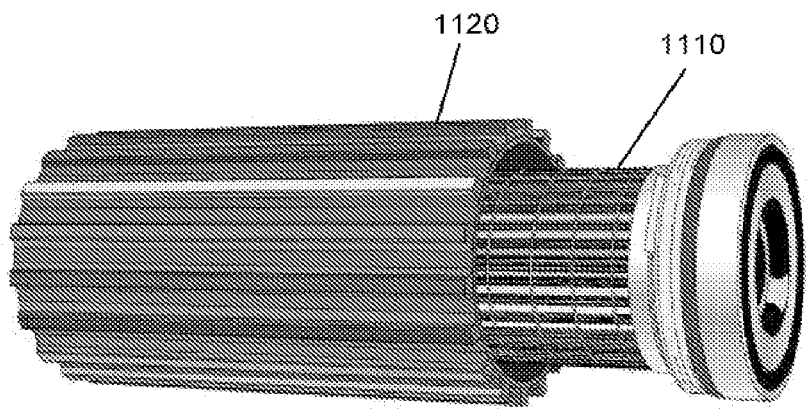

FIG. 11 shows how a tool 1100 can be used to unscrew a primary filter assembly 1110 from a cover 1120. In some embodiments one or more set of threads may be provided on the primary filter assembly and/or cover that may enable them to screw into one another. Alternatively, other surface features may be provided that may enable the primary filter to engage with the cover. The tool may have a central portion 1130 that may interface with the primary filter assembly. The central portion may lock with a portion of the primary filter assembly, and the tool may be turned to unscrew or otherwise detach the primary filter assembly from the cooling cover. In some embodiments, a wrench may be used to unscrew a primary filter media assembly from a cooling cover by turning counter clockwise.

Figure 12:
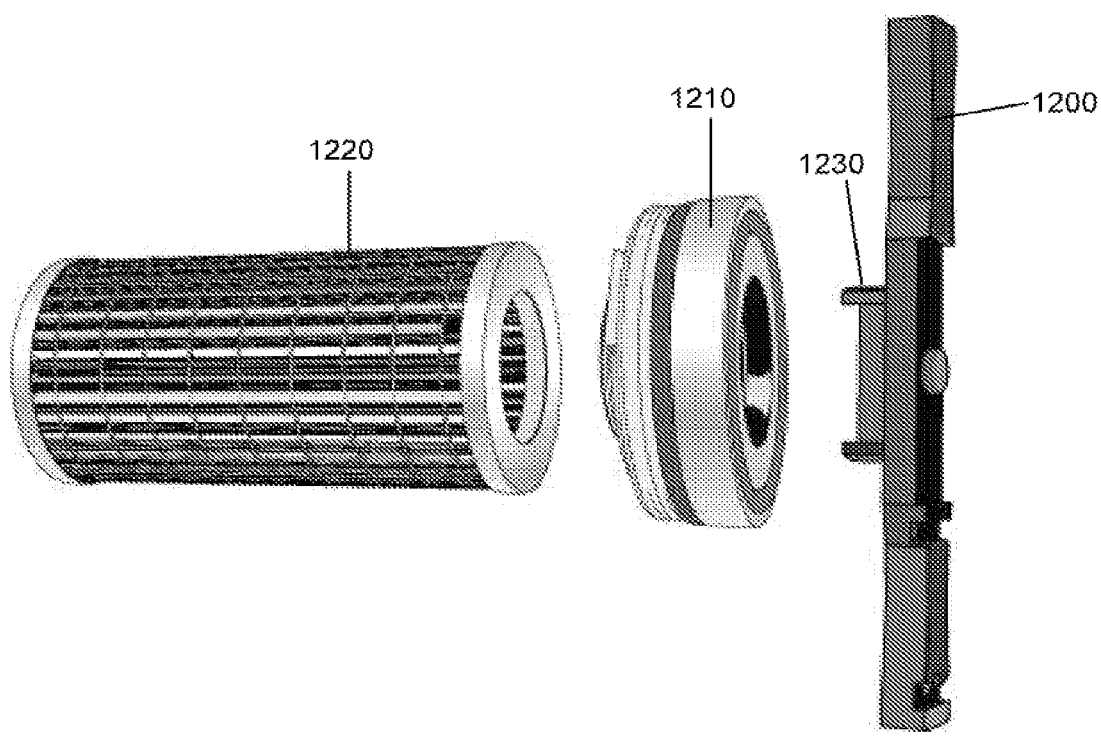
FIG. 12 shows how a tool can be used to separate a mounting plate from a primary filter assembly.

FIG. 12 shows how a tool 1200 can be used to separate a mounting plate 1210 from a primary filter assembly 1220. In some embodiments one or more set of threads may be provided on the primary filter assembly and/or mounting plate that may enable them to screw into one another. Alternatively, other surface features may be provided that may enable the primary filter to engage with the mounting plate. In some embodiments, a central portion 1230 of the tool may interface with the mounting plate. A user may grip the primary filter media assembly by the base and use the tool to unscrew the mounting plate from the primary filter media assembly. Preferably, the user grips the primary filter assembly by the base and not the shark cage, although in alternate embodiments, the user may grip any portion of the filter assembly.

Figure 13:
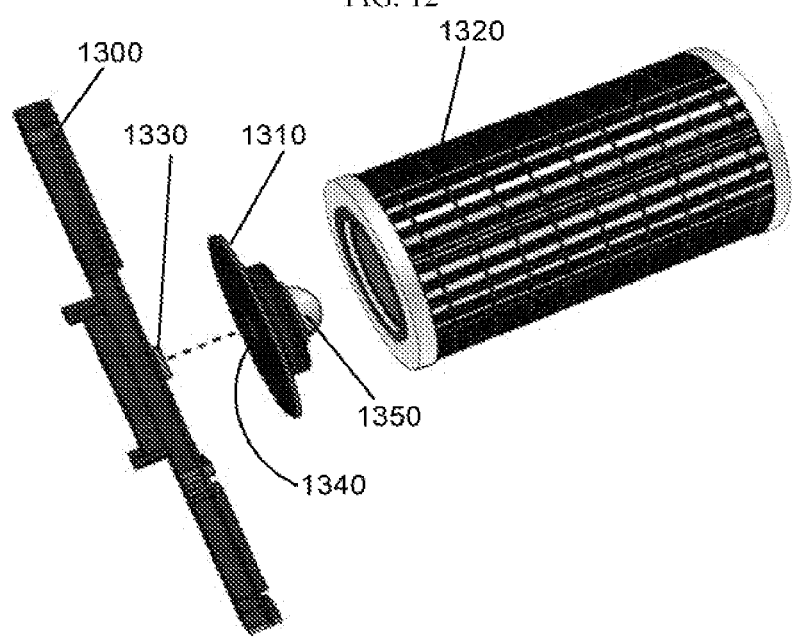
FIG. 13 shows how a tool can be used to separate a secondary filter valve seat from a secondary filter housing.

FIG. 13 shows how a tool 1300 can be used to separate a secondary filter valve seat 1310 from a secondary filter housing 1320. In some embodiments one or more set of threads may be provided on the secondary filter assembly and/or seat valve may enable them to screw into one another. Alternatively, other surface features may be provided that may enable the secondary filter to engage with the seat valve. In some embodiments, a rear portion 1330 of the tool (such as a wrench) may be used to interface with the valve seat. For example, the rear portion of the tool may lock in with a central portion 1340 of the valve seat. A valve sphere 1350 may be provided in the valve seat. The valve seat or assembly may be different based on the type of valve used.

Figure 14:
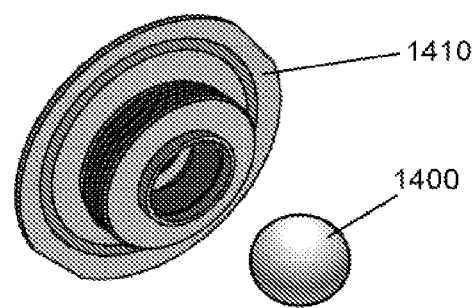
FIG. 14 shows an example of a valve sphere and a valve seat.

FIG. 14 shows an example of a valve sphere 1400 and a valve seat 1410. The valve sphere may rest in the valve seat. In some embodiments, the valve sphere may be sitting freely in the valve seat, so the valve seat may be removed with caution to avoid losing the sphere. As previously mentioned, other valve configurations may be used or provided, and may have different components or configurations.

Figure 15:
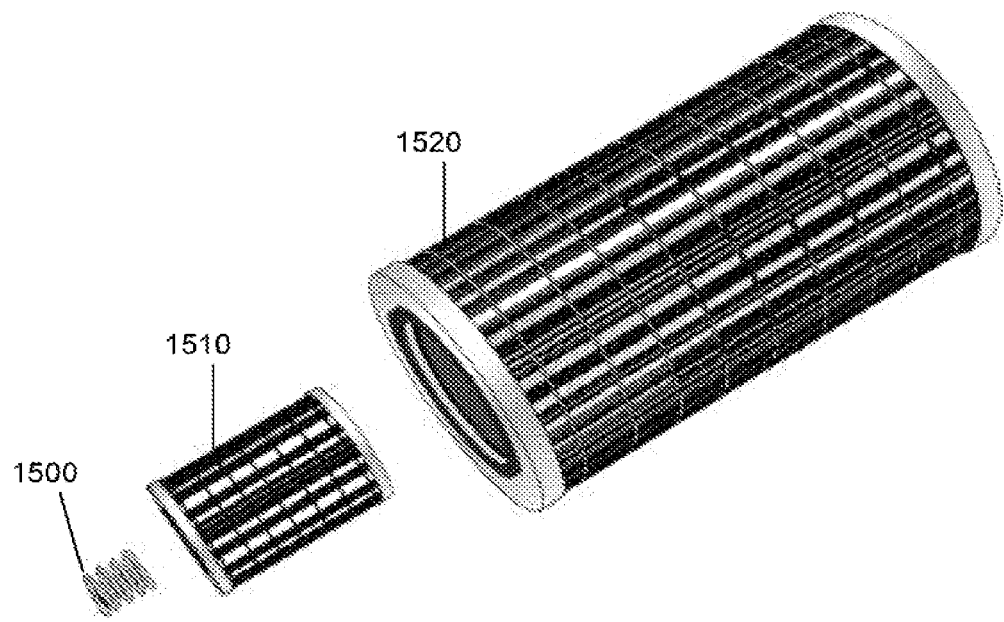
FIG. 15 shows that a spring and secondary filter can be removed from a primary assembly.

FIG. 15 shows that a spring 1500 and secondary filter 1510 can be removed from a primary assembly 1520. After the valve seat has been removed, the spring and secondary filter media may simply slip out of the primary filter media assembly.

Figure 16:
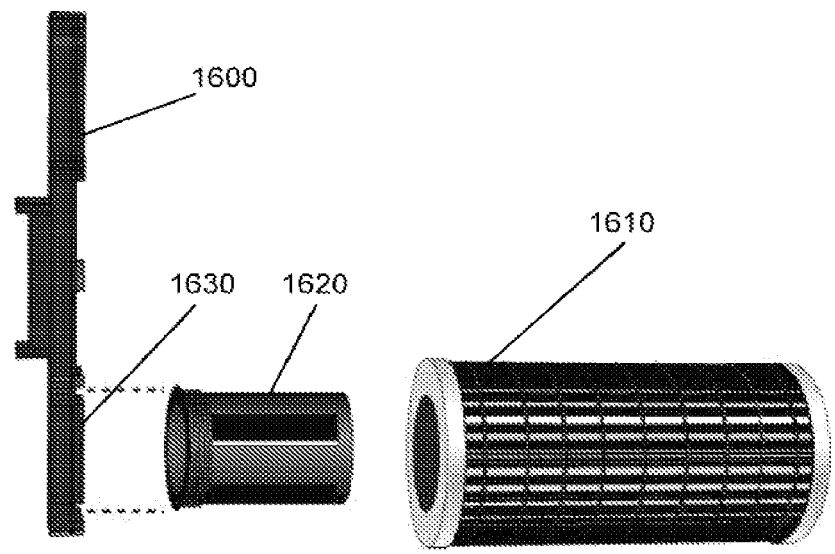
FIG. 16 shows how a tool can be used to remove a secondary media filter housing.

FIG. 16 shows how a tool 1600 can be used to remove a secondary media filter housing 1620. The secondary media filter housing may be removed from a primary filter media 1610. In some embodiments one or more set of threads may be provided on the secondary filter housing and/or primary media filter may enable them to screw into one another. Alternatively, other surface features may be provided that may enable the secondary filter housing to engage with the primary media filter. In some embodiments, a side rear portion 1630 of the tool may be used to interface with the secondary media filter. The secondary media filter housing may be unscrewed from the primary media filter using a side rear portion of the wrench.

Figure 17:
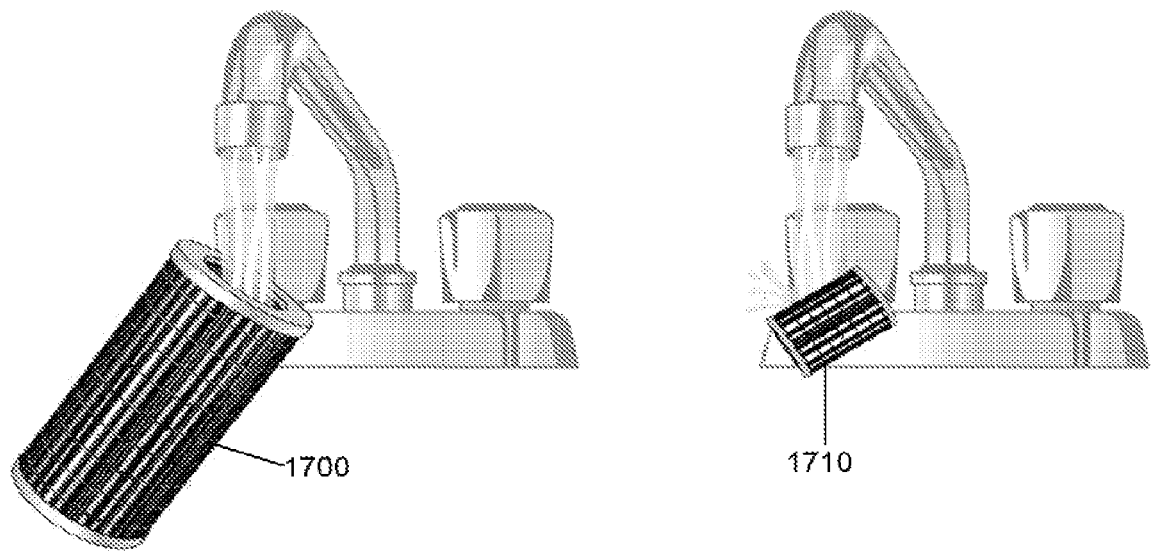
FIG. 17 shows an example of how filters can be washed.

FIG. 17 shows an example of how filters can be washed. For example, filters media can be cleaned using hot tap water and dish washing soap. For example, water may be provided from a faucet or other directed source of water. In commercial applications, a parts washing system may also achieve excellent results. In some embodiments, a dishwashing machine may be used. A primary filter media 1700 may have contaminates that may accumulate on the outside of the filter media, so it may be rinsed from inside out. For example, the flow of water may be directed from the inside of the filter outwards. A secondary filter media 1710 may collect contaminates, so it may be rinsed from outside in. For example, the flow of water may be directed from the outside of the filter inwards.

Figure 18:
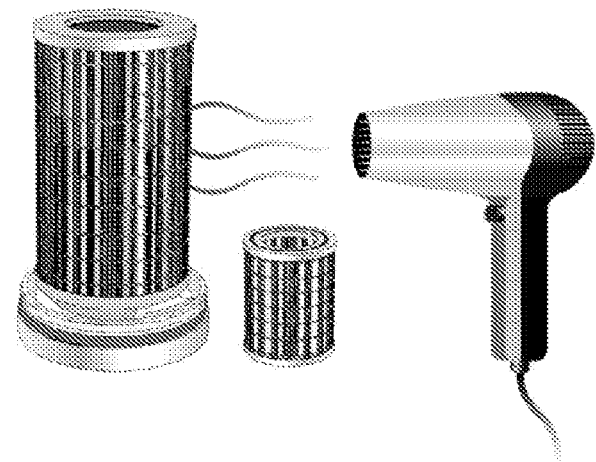
FIG. 18 shows an example of how filters can be dried.

FIG. 18 shows an example of how filters can be dried. The filter media may be dried using a synthetic cloth or household hair dryer. Preferably, paper towels or cloth that would easily tear or could leave paper or cloth residue in the oil filter, will not be used. In some embodiments, the filters may be air dried, blow dried, heated, wiped dry, or may be dried using any other techniques.

Figure 19:
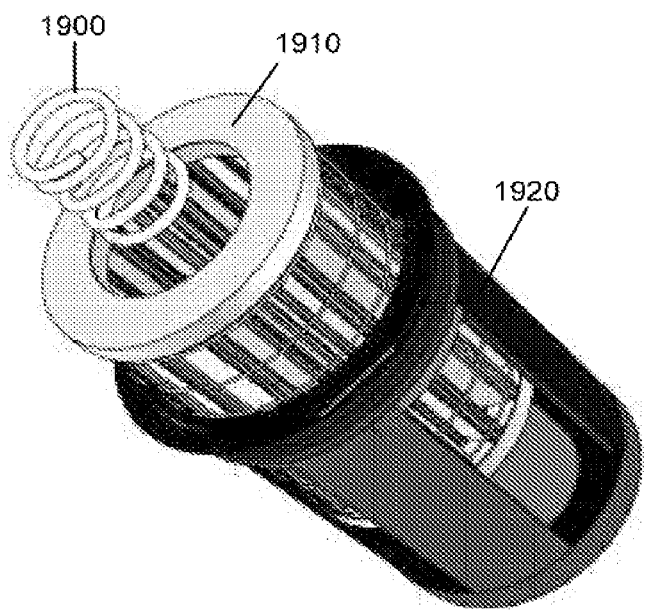
FIG. 19 shows how a secondary filter housing assembly can be reassembled.

FIG. 19 shows how a secondary filter housing assembly can be reassembled. A spring 1900 may be fitted within a secondary media filter 1910, which may be fitted within a secondary media filter housing 1920. The spring may slide into the secondary media filter, which may slide into the secondary media filter housing. When reassembling the secondary media filter assembly, the user may make sure that the spring is seated properly on a spring post.

Figure 20:
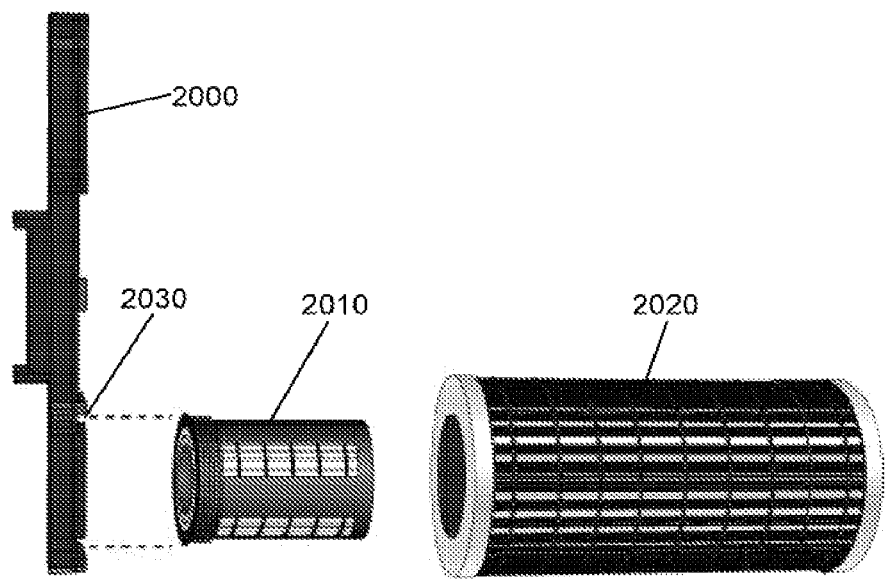
FIG. 20 shows how a tool can be used to reassemble the secondary filter into the primary filter assembly.

FIG. 20 shows how a tool 2000 can be used to reassemble the secondary filter 2010 into the primary filter assembly 2020. In some embodiments, a side-rear portion 2030 of the tool can be used to screw the secondary filter assembly into the primary filter assembly. The reassembled secondary filter media assembly may be screwed back into the primary filter media assembly by turning clockwise, and may be tightened using the tool (e.g., LOF wrench).

Figure 21:
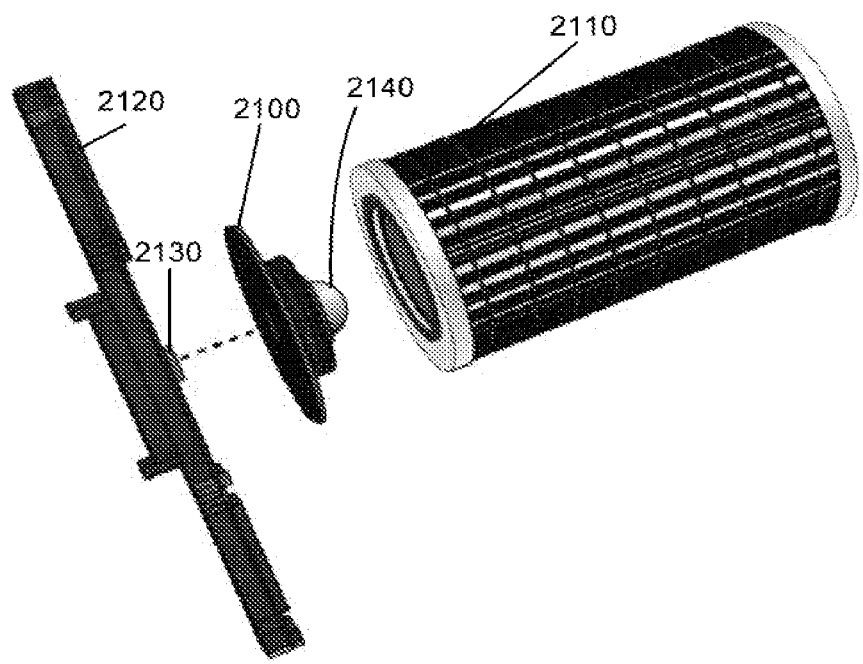
FIG. 21 shows how a valve seat can be reassembled with the secondary assembly.

FIG. 21 shows how a valve seat 2100 can be reassembled with the secondary assembly 2110. A tool 2120 may be used to screw the valve seat into the secondary media assembly. While reattaching the valve seat, a user may make sure that the valve sphere 2140 is seated in the valve seat. The valve seat may be tightened using a rear portion 2130 of the tool (e.g., turning clockwise).

Figure 22:
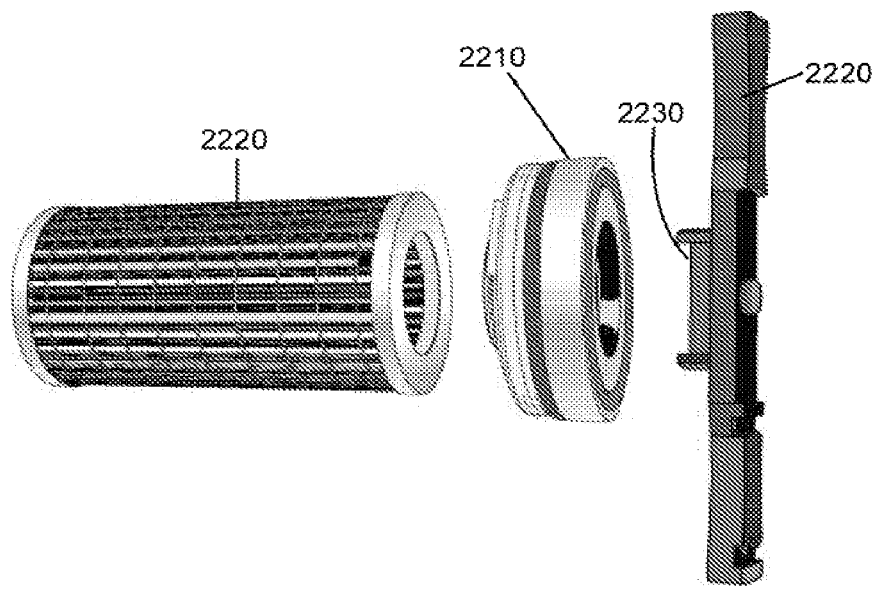
FIG. 22 shows how a tool can be used to reassemble a mounting plate with a primary filter assembly.

FIG. 22 shows how a tool 2200 can be used to reassemble a mounting plate 2210 with a primary filter assembly 2220. In some embodiments, a central portion 2230 of the tool may be used to interface with the mounting plate, and screw the mounting plate onto the primary filter assembly. The mounting plate may be screwed back onto the primary filter assembly (turning clockwise). The primary mounting plate may be tightened using a tool (e.g., LOF wrench).

If the mounting plate is still fastened to an engine or other machine, the primary filter may be grasped by the base and screwed to the mounting plate. Preferably, a user will grasp the primary filter by the base and not grip the filter by the shark cage. In alternate embodiments, the user may grasp the primary filter anywhere. In some embodiments, the primary filter may be screwed to the mounting plate by turning clockwise. The primary filter may be screwed to the mounting plate to be hand tight. In other embodiments, the tool may or may not be able to interface with the base of the primary filter to tighten it onto the mounting plate. Then a user may continue by screwing a cooling cover over the primary filter media and only the mounting plate. There may be resistance as the mounting plate seal may contact the inside of the cooling cover. The user may continue to screw the cooling cover until the cooling cover top contacts the mounting plate. In some embodiments, the cooling cover may be hand tightened to the mounting plate. In other embodiments, a tool may be used to tighten the cooling cover to the mounting plate.

Figure 23:
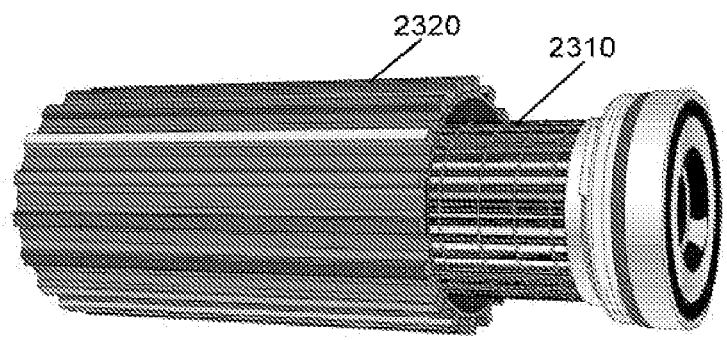
FIG. 23 shows how a tool can be used to reassemble a primary filter assembly with a cooling cover.
Figure 23:
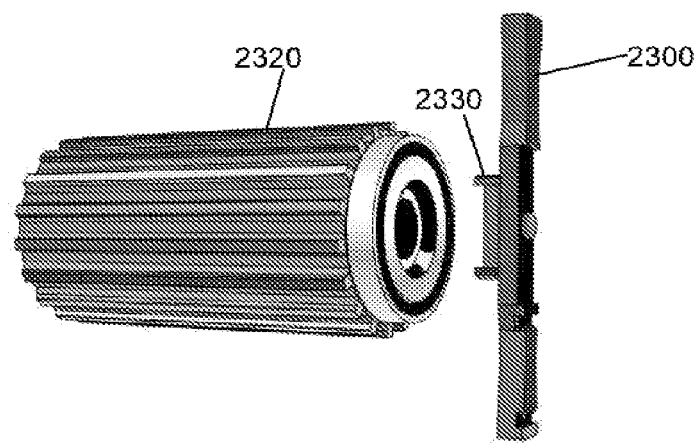

FIG. 23 shows how a tool 2300 can be used to reassemble a primary filter assembly 2310 with a cooling cover 2320. In some embodiments, a central portion 2330 of the tool may be used to screw the primary filter assembly into the cooling cover. The primary filter media may be screwed back into the cooling cover. Then it may be tightened using the tool (e.g., wrench) by turning clockwise.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for filtering oil, comprising: providing (i) a filter assembly comprising a primary filter configured to removably attach to a mounting plate, a secondary filter disposed within the primary filter, and a pressure-actuated valve; and (ii) an elongated tool comprising a first portion and a second portion, wherein the first portion is configured to engage with the primary filter to apply a torque between the primary filter and another portion of the filter assembly, wherein the second portion is configured to engage with the pressure-actuated valve or the secondary filter.

2. The method of claim 1, further comprising using the elongated tool to isolate the primary filter and the secondary filter from the filter assembly.

3. The method of claim 2, further comprising cleaning the primary filter and the secondary filter isolated from the filter assembly to yield a cleaned primary filter and a cleaned secondary filter, and reassembling the cleaned primary filter and the cleaned secondary filter with the filter assembly.

4. The method of claim 1, wherein the pressure-actuated valve is movable between an open position and a closed position, and is disposed between the primary filter and the secondary filter such that a fluid in the filter assembly passes across the secondary filter only when the valve is in its open position.

5. The method of claim 4, wherein the pressure-actuated valve is movable into the open position in response to a pressure differential.

6. The method of claim 1, wherein the primary filter has a first porosity and the secondary filter has a second porosity greater than the first porosity.

7. The method of claim 1, wherein the first portion is a central portion that interfaces with the primary filter.

8. The method of claim 1, wherein the elongated tool has a rear portion that interfaces with a portion of the pressure-actuated valve.

9. The method of claim 1, wherein the elongated tool has a side rear portion that interfaces with the secondary filter.

10. The method of claim 1, wherein the elongated tool has a central portion that interfaces with the primary filter, a rear portion that interfaces with a portion of the pressure-actuated valve, and a side rear portion that interfaces with the secondary filter.

11. The method of claim 1, wherein the elongated tool is configured to assemble or disassemble the filter assembly by applying torque between the secondary filter or the pressure-actuated valve and another portion of the filter assembly, respectively.

12. The method of claim 1, wherein the elongated tool is configured to assemble the filter assembly by applying torque between the primary filter and another portion of the filter assembly in a first direction, and disassemble the filter assembly by applying torque between the primary filter and the another portion of the filter assembly in a second direction opposite the first direction.

13. The method of claim 12, wherein the primary filter and the mounting plate are threadedly coupled to each other.

14. The method of claim 12, wherein the primary filter and the secondary filter are threadedly coupled to each other or the secondary filter and the pressure-actuated valve are threadedly coupled to each other.

15. The method of claim 1, wherein the first portion and the second portion of the tool are sized to grip or fit to at least one of the primary filter, secondary filter, and the pressure-actuated valve.

16. The method of claim 1, wherein the first portion and the second portion of the tool are integrally formed from a single piece.

17. The method of claim 1, wherein the first portion and the second portion of the tool are fixed relative to each other.

18. The method of claim 1, wherein the primary filter and the secondary filter are concentric.

19. The method of claim 1, wherein the primary filter is substantially cylindrical and includes an end cap with a threaded aperture for mounting thereto a secondary filter assembly that includes a secondary filter housing, wherein the secondary filter housing at least partially encloses the secondary filter and fixes the secondary filter and the pressure-actuated valve to the end cap with a ball seat and seal plate.

20. The method of claim 1, wherein the mounting plate comprises a tapered conduit.

\* \* \* \* \*